W. V. TURNER.
FLUID PRESSURE BRAKE.
APPLICATION FILED JAN. 13, 1914.
1,142,860.
Patented June 15, 1915.
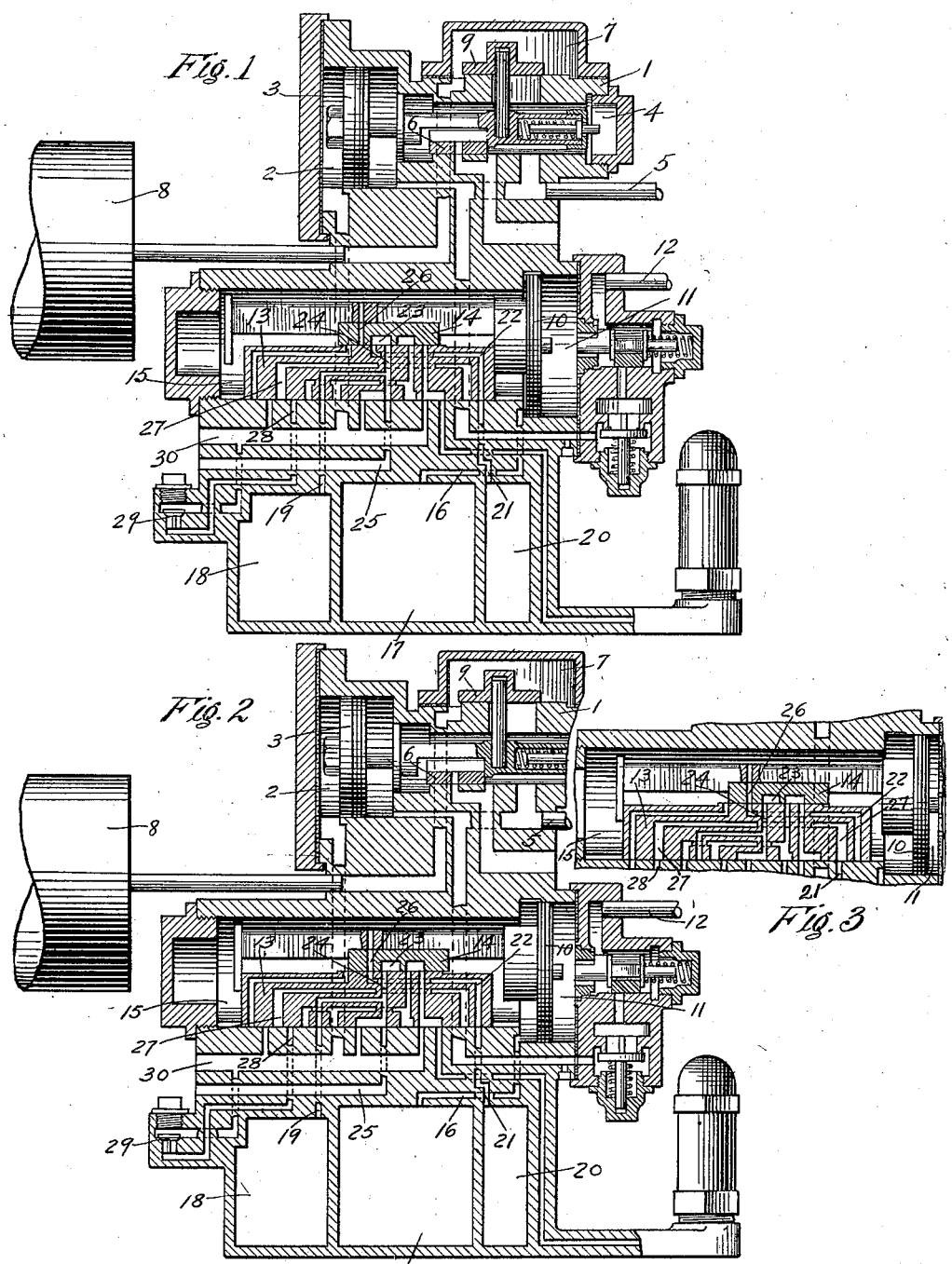
WITNESSES
INVENTOR
Walter V. Turner
by Wm. M. Cady.
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,142,860.  Specification of Letters Patent.  Patented June 15, 1915.

Application filed January 13, 1914. Serial No. 811,829.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake controlling valve device operated upon a reduction in brake pipe pressure for supplying fluid to the brake cylinder.

In connection with valve devices of the above character, it is highly desirable to prevent the brakes from applying under such light reductions in brake pipe pressure as may be produced by brake pipe leakage or other causes which tend to reduce the brake pipe pressure unintentionally.

The principal object of my invention is to provide improved means for preventing the brakes from applying until a predetermined reduction in brake pipe pressure is made.

In the accompanying drawing; Figure 1 is a central sectional view of a distributing valve device with my improvement applied thereto, and showing the parts in normal release position, Fig. 2 a similar view, showing the parts in position after the preliminary movement of the graduating valve; and Fig. 3 a central sectional view of the equalizing valve portion, showing the parts in service application position.

According to the drawing, my invention is shown as applied to a distributing valve device of the type employed on locomotives for controlling the locomotive brakes, but it will be understood that the invention may be employed in connection with the usual triple valve and various other forms of brake controlling valve devices.

As shown in the drawing, the distributing valve device comprises a casing 1 having a piston chamber 2 containing application and release piston 3, a valve chamber 4 open to brake cylinder pipe 5 and containing release slide valve 6, and valve chamber 7 connected to supply reservoir 8 and containing application valve 9.

The equalizing portion of the distributing valve device comprises a piston 10 contained in piston chamber 11 open to brake pipe 12 and main slide valve 13 and graduating slide valve 14 contained in valve chamber 15 and adapted to be operated by piston 10.

Valve chamber 15 is connected by passage 16 to the usual pressure chamber 17 and application chamber 18 is provided with a passage 19 leading to the seat of the main slide valve 13.

According to my improvement, an additional chamber 20 is provided having a passage 21 leading to the seat of the main slide valve 13.

In the normal release position of the parts, as shown in Fig. 1 of the drawing, passage 21 registers with port 22 in the main slide valve 13 and said port is connected through cavity 23 in the graduating valve 14 and port 24 in the main valve 13 with exhaust passage 25. It will thus be seen that the chamber 20 is normally maintained at atmospheric pressure.

Upon reducing the brake pipe pressure to effect an application of the brakes, the initial movement of the equalizing piston 10 shifts the graduating slide valve 14 to the position shown in Fig. 2 of the drawing. In this position, port 22 registers with a through port 26 in the graduating valve, so that fluid from the valve chamber 15 and the pressure chamber 17 is vented to the chamber 20. If the reduction in brake pipe pressure is less than the reduction in pressure in the valve chamber 15 due to equalization into the chamber 20, then no further movement of the equalizing piston toward application position will take place, and by making the volume of the chamber 20, such that the equalizing pressure corresponds with some predetermined reduction in brake pipe pressure, less than which it is desired that the brakes should not apply, it will be clear that unless the reduction in brake pipe pressure equals or exceeds this predetermined amount, movement of the equalizing piston to application position will be prevented. If, however, the reduction in brake pipe pressure equals or exceeds the predetermined amount, then after the pressure in the valve chamber 15 and the pressure chamber 17 has equalized into the chamber 20, the equalizing piston 10 will be shifted in the usual manner to application position.

In order to compensate for the loss in pressure in the pressure chamber due to equalization into the chamber 20, I preferably provide means for connecting the reduction reservoir 20 with the application chamber upon movement of the parts to service application position. For this purpose, an additional port or cavity 27 is provided in the main valve 13 which is adapted in service application position to connect passage 21 with a passage 28, containing a non-return check valve 29 and opening into passage 30 leading to the application chamber, as shown in Fig. 3 of the drawing.

By venting the pressure in the reduction reservoir 20 into the application chamber volume, the loss in pressure due to equalizing the pressure in the pressure chamber into the reduction reservoir 20 is compensated for to a large extent.

The operation of the application and release portion of the distributing valve device has not been described in detail, since the same corresponds with that of the distributing valve device of the well known E. T. locomotive brake apparatus.

Having now described my invention, what I claim as new and desire to secure by Letters Patent, is:—

1. In a fluid pressure brake, the combination with a brake pipe, of a piston subject to the opposing pressures of the brake pipe and a chamber, a main valve and a graduating valve operated by said piston for controlling the brakes, a reduction reservoir, and means operated upon the preliminary movement of the graduating valve toward application position for venting fluid from said chamber to said reservoir.

2. In a fluid pressure brake, the combination with a brake pipe, an application chamber, and an application valve mechanism operated by the pressure in the application chamber for effecting an application of the brakes, of an equalizing valve device subject to the opposing pressures of the brake pipe and a valve chamber for controlling the pressure in said application chamber, a reduction reservoir, and means operated upon the initial movement of the equalizing valve device to the position for supplying fluid to the application chamber for venting fluid from said valve chamber to the reduction reservoir.

3. In a fluid pressure brake, the combination with a brake pipe, of an application chamber, means controlled by the pressure in said chamber for controlling the brakes, an equalizing valve device subject to the opposing pressures of the brake pipe and a valve chamber for controlling the pressure in the application chamber, a reduction reservoir normally at atmospheric pressure, and means operating upon the initial movement of said equalizing valve device from release position for venting fluid from said valve chamber to said reduction reservoir and for connecting the reduction reservoir with the application chamber in application position.

4. In a fluid pressure brake, the combination with a brake pipe, an application chamber, and an equalizing valve device subject to the opposing pressures of the brake pipe and a valve chamber for controlling the pressure in the application chamber, of a reduction reservoir normally at atmospheric pressure and adapted to be connected to said valve chamber upon the initial movement of said valve device and to the application chamber upon movement to application position.

In testimony whereof I have hereunto set my hand.

WALTER V. TURNER.

Witnesses:
A. M. CLEMENTS,
B. A. OLIVER.

Copies of this patent may be obtained for five cents each, by addressing the "Commissioner of Patents, Washington, D. C."